US007944421B2

(12) United States Patent
Inazumi (10) Patent No.: US 7,944,421 B2
(45) Date of Patent: May 17, 2011

(54) IMAGE DISPLAY SYSTEM, IMAGE DISPLAY METHOD, IMAGE DISPLAY DEVICE, IMAGE DATA PROCESSOR, PROGRAM, STORAGE MEDIUM, AND IMAGE PROCESSING PROGRAM DISTRIBUTION SERVER

(75) Inventor: Mitsuhiro Inazumi, Suwa (JP)

(73) Assignee: Seiko Epson Corporation, Tokyo (JP)

(*) Notice: Subject to any disclaimer, the term of this patent is extended or adjusted under 35 U.S.C. 154(b) by 836 days.

(21) Appl. No.: 11/465,282

(22) Filed: Aug. 17, 2006

(65) Prior Publication Data
US 2007/0040819 A1    Feb. 22, 2007

(30) Foreign Application Priority Data
Aug. 17, 2005    (JP) .................................. 2005-236624

(51) Int. Cl.
G09G 3/36    (2006.01)
G03B 21/00    (2006.01)
(52) U.S. Cl. ............................. 345/87; 353/30; 353/122
(58) Field of Classification Search .................. 345/3.1, 345/87–89; 353/30; 715/717, 719; 719/318–323; 709/201, 212, 213, 217, 220, 223; 725/118
See application file for complete search history.

(56) References Cited

U.S. PATENT DOCUMENTS

| | | | | |
|---|---|---|---|---|
| 4,965,559 A * | 10/1990 | Dye | ................................ | 345/2.2 |
| 6,117,186 A * | 9/2000 | Wydall et al. | ................. | 717/174 |
| 6,137,794 A * | 10/2000 | Brown | ........................... | 370/360 |
| 6,421,748 B1 * | 7/2002 | Lin et al. | ......................... | 710/65 |
| 6,943,752 B2 * | 9/2005 | Masumoto et al. | ........... | 345/1.1 |
| 2001/0003479 A1 * | 6/2001 | Fujiwara | ....................... | 353/122 |
| 2002/0122158 A1 * | 9/2002 | Miyashita et al. | .............. | 353/30 |
| 2002/0196378 A1 * | 12/2002 | Slobodin et al. | .............. | 348/744 |

(Continued)

FOREIGN PATENT DOCUMENTS
JP    A 2004-088194    3/2004
JP    A-2005-141602    6/2005

*Primary Examiner* — Richard Hjerpe
*Assistant Examiner* — Dorothy Harris
(74) *Attorney, Agent, or Firm* — Oliff & Berridge, PLC (57) ABSTRACT

An image display system includes an image data processor that processes image data, an image display device that displays an image based on the image data processed by the image data processor, and a transmission path that allows bi-directional data communication between the image data processor and the image display device. The image display device includes an image processing program storing unit that stores an image processing program including characteristics correction data corresponding to the image display device, an image processing program transmitting unit responsive to a transmission request for an image processing program received from the image data processor through the transmission path for transmitting the image processing program stored in the image processing program storing unit through the transmission path, and an image display unit that displays an image based on the processed image data received from the image data processor through the transmission path. The image data processor includes an image processing program transmission request unit that requests the image display device to transmit an image processing program, an image processing program executing unit that executes the image processing program transmitted from the image display device in response to the request by the image processing program transmission request unit, thereby executing image data processing including characteristics correction processing for the image display device based on the characteristics correction data, and an image data transmitting unit that transmits the image data processed by the image processing program executing unit to the image display device through the transmission path.

15 Claims, 7 Drawing Sheets

U.S. PATENT DOCUMENTS

| | | | |
|---|---|---|---|
| 2003/0088866 A1* | 5/2003 | Boldon et al. | 717/170 |
| 2003/0117587 A1* | 6/2003 | Olson et al. | 353/30 |
| 2003/0159137 A1* | 8/2003 | Drake et al. | 717/172 |
| 2004/0117202 A1* | 6/2004 | Winklevoss et al. | 705/1 |
| 2004/0150801 A1* | 8/2004 | Kitada et al. | 353/122 |
| 2005/0219467 A1* | 10/2005 | Nomizo et al. | 353/30 |
| 2006/0012604 A1* | 1/2006 | Seetharamaiah et al. | 345/582 |

* cited by examiner

IMAGE DISPLAY SYSTEM, IMAGE DISPLAY METHOD, IMAGE DISPLAY DEVICE, IMAGE DATA PROCESSOR, PROGRAM, STORAGE MEDIUM, AND IMAGE PROCESSING PROGRAM DISTRIBUTION SERVER

This application claims priority from Japanese Patent Application No. 2005-236624, filed in the Japanese Patent Office on Aug. 17, 2005, the entire disclosure of which is hereby incorporated by reference in its entirety.

BACKGROUND

1. Technical Field

The present invention relates to an image display system, an image display method, an image display device, an image data processor, a program, a storage medium, and an image processing program distribution server.

2. Related Art

There have been known image display systems including a personal computer that processes image data (image data processor), a liquid crystal projector (image display device) that displays an image based on image data processed by the personal computer, and a USB (Universal Serial Bus) cable (transmission path) that transmits data between the personal computer and the liquid crystal projector (see for example JP-A-2004-88194).

In the image display system disclosed by JP-A-2004-88194, image data based on which an image is to be displayed by the liquid crystal projector is input to the personal computer and processed therein, and then transmitted to the liquid crystal projector through the USB cable. The liquid crystal projector displays the image on a screen based on the processed image data received through the USB cable.

At the time, one kind of processing carried out by the personal computer is characteristics correction processing for the liquid crystal projector. In this processing, using parameters for characteristics correction processing (characteristics correction data) for each individual liquid crystal projector, the image data is corrected according to the characteristics of each liquid crystal projector, and the processing includes for example VT correction (V: voltage applied to the liquid crystal panel in the liquid crystal projector, T: the transmittance of the liquid crystal panel), γ correction and color unevenness correction.

The parameters for characteristics correction processing refer to parameters specific to each individual liquid crystal projector and stored in the parameter memory of each liquid crystal projector. Once the image display system is activated, the parameters for characteristics correction processing are read out and transmitted to the personal computer. The personal computer stores the received parameters for characteristics correction processing and executes characteristics correction processing for the liquid crystal projector based on the characteristics correction processing parameters. Note that in order to carry out characteristics correction processing based on the parameters for characteristics correction processing, a display device driver corresponding to the kind of the liquid crystal projector must be installed in advance. More specifically, the characteristics correction processing for the liquid crystal projector in the personal computer can be executed only when the display device driver installed in advance and the characteristics correction processing parameters received from the liquid crystal projector are available.

As described above, in the image display system disclosed by JP-A-2004-88194, the display device driver corresponding to the kind of the liquid crystal projector must be installed in advance in order to execute the characteristics correction processing for the liquid crystal projector.

However, in order to install such a display device driver, the personal computer must be connected to a network to download the display device driver, or the display device driver must be read out from a storage medium such as a CD-ROM, which is a troublesome operation. When the kind of the image display device (such as a liquid crystal projector) used for displaying images is to be changed, a new display device driver corresponding to the kind of the new device must be installed all over again, which is particularly cumbersome. Furthermore, when such a display device driver is upgraded to a new version, the new version driver must installed, and this is inconvenient.

The display device driver must be compatible with the OS (Operating System) or the video function of the personal computer to which the driver is installed, and the adaptation can be very costly or time-consuming in view of much diversified OS and video functions of today.

SUMMARY

An advantage of some aspects of the invention is to provide an image display system, an image display method, an image display device, an image data processor, a program, a storage medium, and an image processing program distribution server that allow an execution environment for image data processing in the image data processor to be readily prepared without having to carry out complicated operations.

An image display system according to an aspect of the invention includes an image data processor that processes image data, an image display device that displays an image based on the image data processed by the image data processor, and a transmission path that allows bi-directional data communication between the image data processor and the image display device. The image display device includes an image processing program storing unit that stores an image processing program including characteristics correction data corresponding to the image display device, an image processing program transmitting unit responsive to a transmission request for an image processing program received from the image data processor through the transmission path for transmitting the image processing program stored in the image processing program storing unit through the transmission path, and an image display unit for displaying an image based on the processed image data received from the image data processor through the transmission path. The image data processor includes an image processing program transmission request unit for requesting the image display device to transmit an image processing program, an image processing program executing unit that executes the image processing program transmitted from the image display device in response to the request by the image processing program transmission request unit, thereby executing image data processing including characteristics correction processing for the image display device based on the characteristics correction data, and an image data transmitting unit for transmitting the image data processed by the image processing program executing unit to the image display device through the transmission path.

In the image display system according to the aspect of the invention having the above-described structure, the image display device transmits an image processing program in response to a transmission request from the image data processor. The image processing program is used to have the image data processor process the image data and generally referred to as "shader." According to the aspect of the invention, the image processing program particularly includes characteristics correction data corresponding to the image display device (corresponding to the characteristics correction parameters in the disclosure of JP-A-2004-88194), and therefore the image data processor can execute characteristics correction processing for the image display device.

The image display system according to the aspect of the invention is greatly different from the image display system disclosed by JP-A-2004-88194 in the characteristics correction processing for the image display device. More specifically, in the image display system disclosed by JP-A-2004-88194, a display device driver corresponding to the kind of the image display device has to be installed in the image data processor in advance, but such a pre-installing procedure is not necessary in the image display system according to the aspect of the invention. More specifically, data corresponding to the kind of the image display device that is included in the display device driver in the image display system disclosed by JP-A-2004-88194 is included in the image processing program in the image display system according to the aspect of the invention. Therefore, the image data processor needs only have a general-purpose execution environment that allows the image processing program to be executed and can execute processing corresponding to the kind of the image display device based on the data included in the image processing program. Note that according to the aspect of the invention, the general-purpose environment for executing the image processing program is prepared in the image processing program executing unit. Such an image processing program executing unit can be implemented for example by a recently developed high performance programmable image processing IC (Integrated Circuit) capable of processing moving image data in real time. The image processing IC in general has been developed for use in a personal computer, and therefore a program execution environment highly suitable for general-purpose use can be provided.

As described above, according to the aspect of the invention, when characteristics correction processing for the image display device is executed by the image data processor, the image data processor needs only be provided with a general-purpose environment for executing an image processing program, and a display device driver corresponding to the kind of the image display device or the like does not have to be installed in advance. Therefore, according to the aspect of the invention, image data processing including the characteristics correction processing for the image display device can readily be executed by the image data processor without having to carry out complicated operation.

It is preferable that in the image display system, the image data processor is connected with at least one image processing program execution device capable of executing the image processing program through a bi-directional communication transmission path, the image data processor includes image processing program executability determining unit that determines whether the image processing program executing unit can execute the image processing program transmitted from the image display device, an image processing program execution device search unit responsive to the determination by the image processing program executability determining unit that the image processing program is not executable for searching for an image processing program execution device that can execute the image processing program, and an image processing program transmitting unit for transmitting the image processing program to an image processing program execution device found by the image processing program execution device search unit and having the found image processing program device execute the image processing program.

With the image display system having the above-described structure, an image processing program that cannot be executed by the image data processor can be executed by an external image processing program execution device. Here, an image processing program cannot be executed if the amount of processing is beyond the processing capability of the image data processor or if the image processing program includes data that cannot be processed with the image data processor. In this case, the image processing program can be executed by an image processing program execution device having the execution capability. In the image display system, the image processing program can be executed among a plurality of devices (the image data processor and image processing program execution devices), so that the processing load of each device can be reduced, and processing can be carried out efficiently in view of the characteristics of each device.

In the image display system, it is preferable that the image data processor is connected with an image processing program distribution server that distributes an image processing program for the image display device through a network that allows bi-directional communication, the image data processor includes an image processing program distribution request unit for requesting the image processing program distribution server to distribute the image processing program for an image display device upon identifying the image display device connected with the image data processor, and the image processing program distribution server includes an image processing program storing unit for storing an image processing program corresponding to the image display device, a distribution request accepting unit that accepts the distribution request from the image data processor, and an image processing program distribution unit responsive to the distribution request accepted by the distribution request accepting unit that distributes the image processing program stored in the image processing program storing unit.

In this structure, it is preferable that image processing programs distributed by the image processing program distribution server to the image data processor are image processing programs irrelevant to the characteristics of the image display device such as an image processing program used to decode image data. In this way, the image processing programs irrelevant to the characteristics of the image display device can be stored in the image processing program distribution server and do not have to be stored in the image display device, so that the structure of the image display device can be simplified. However, the image processing programs to be stored in the image processing program distribution server are not limited to those irrelevant to the characteristics of the image display device, and image processing programs related to the characteristics of the image display device may be stored therein.

In the above-described structure, it is preferable that image processing programs transmitted by the image display device to the image data processor are image processing programs related to the characteristics of the image display device such as an image processing program including characteristics correction data used for the characteristics correction processing for the image display device. In this way, image processing programs related to the characteristics of the image display device can be stored in the image display device itself. However, the image processing programs stored in the image display device are not limited to those related to the characteristics of the image display device, and image processing programs irrelevant to the characteristics of the image display device may be stored therein.

An image display method according to another aspect of the invention uses an image display system including an image data processor that processes image data, an image display device that displays an image based on the image data processed by the image data processor, and a transmission path that allows bi-directional data communication between the image data processor and the image display device. The image display device carries out storing an image processing program including characteristics correction data corresponding to the image display device, transmitting the image processing program stored by the image processing program storing through the transmission path in response to a transmission request for the image processing program received from the image data processor through the transmission path, and displaying an image based on the processed image data received from the image data processor through the transmission path. The image data processor carries out requesting the image display device to transmit an image processing program, executing the image processing program transmitted from the image display device in response to the request by the image processing program transmission request, thereby executing image data processing including characteristics correction processing for the image display device based on the characteristics correction data, and transmitting the image data processed by the image processing program execution to the image display device through the transmission path.

The image display method is sometimes executed by the image display system according to the above-described aspect of the invention, and therefore the above-described functions and effects of the image display system according to the aspect of the invention can be brought about.

An image display device according to yet another aspect of the invention is connected with an image data processor that processes image data through a transmission path that allows bi-directional communication and displays an image based on the image data processed by the image data processor. The image display device includes an image processing program storing unit for storing an image processing program including characteristics correction data corresponding to the image display device, an image processing program transmitting unit responsive to an image processing program transmission request received from the image data processor through the transmission path for transmitting the image processing program stored in the image processing program storing unit through the transmission path, and an image display unit for displaying an image based on the processed image data received from the image data processor through the transmission path.

The image display device forms the image display system according to the above-described aspect of the invention and therefore the above-described functions and effects of the image display system according to the aspect of the invention can be brought about.

An image data processor according to yet another aspect of the invention is connected with an image display device through a transmission path that allows bi-directional communication, processes image data and transmits the image data to the image display device through the transmission path. The image data processor includes image processing program transmission request unit that requests the image display device to transmit an image processing program including characteristics correction data corresponding to the image display device, an image processing program executing unit for executing the image processing program transmitted from the image display device in response to the request by the image processing program transmission request unit, thereby executing image data processing including characteristics correction processing for the image display device based on the characteristics correction data, and an image data transmitting unit for transmitting the image data processed by the image processing program executing unit to the image display device through the transmission path.

Since the image data processor forms the image display system according to the above-described aspect of the invention, the functions and effects of the image display system according to the aspect of the invention can be brought about.

A program according to a further aspect of the invention is executed in an image data processor connected with an image display device through a transmission path that allows bi-directional communication, processing image data and transmitting the processed data to the image display device through the transmission path. The program enables a computer incorporated in the image data processor to function as image processing program transmission request means for requesting the image display device to transmit an image processing program including characteristics correction data corresponding to the image display device, image processing program executing means for executing the image processing program transmitted from the image display device in response to the request by the image processing program transmission request means, thereby executing image data processing including characteristics correction processing for the image display device based on the characteristics correction data, and image data transmitting means for transmitting the image data processed by the image processing program executing means to the image display device through the transmission path.

A storage medium according to a still further aspect of the invention is a computer-readable storage medium that stores the program described above.

The program and the storage medium described above are used for carrying out the image display method according to the above-described aspect of the invention, so that the functions and effects of the image display method according to the aspect of the invention can be brought about.

An image processing program distribution server according to a still further aspect of the invention is connected through a bi-directional communication network with an image display system that includes an image data processor that processes image data, an image display device that displays an image based on the image data processed by the image data processor, and a transmission path that allows bi-directional data communication between the image data processor and the image display device and the server distributes an image processing program for the image display device to the image data processor through the network. The image processing program distribution server includes an image processing program storing unit that stores an image processing program corresponding to the image display device, a distribution request accepting unit that accepts a distribution request from the image data processor, and an image processing program distribution unit responsive to the distribution request accepted by the distribution request accepting unit to distributes an image processing program stored in the image processing program storing unit.

The image processing program distribution server described above forms the image display system according to the above-described aspect of the invention, and therefore the functions and effects of the image display system according to the aspect of the invention can be brought about.

BRIEF DESCRIPTION OF THE DRAWINGS

The invention will be described with reference to the accompanying drawings, wherein like numbers reference like elements.

DETAILED DESCRIPTION OF EMBODIMENTS

First Embodiment

Figure 1:
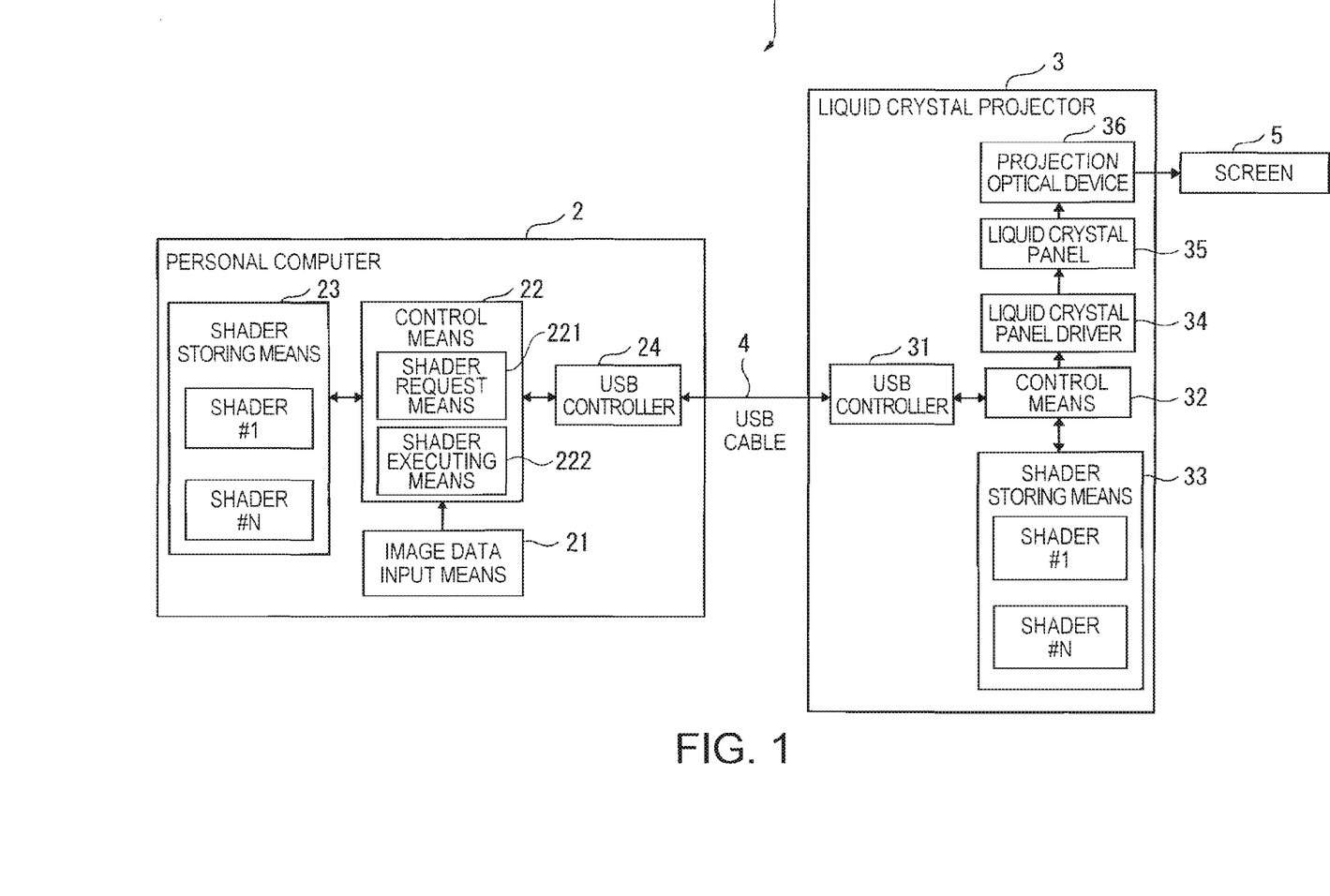
FIG. 1 is a functional block diagram of an image display system according to a first embodiment of the invention.

FIG. 1 is a functional block diagram of an image display system 1 according to a first embodiment of the invention.

The image display system 1 includes a personal computer 2 as an image data processor that processes image data, a liquid crystal projector 3 as an image display device that displays an image based on image data processed by the personal computer 2, and a USB cable 4 as a transmission path that allows bi-directional data communication between the personal computer 2 and the liquid crystal projector 3.

The personal computer 2 includes image data input means 21, control means 22, shader storing means 23, and a USB controller 24 as communication means.

The image data input means 21 serves as means for inputting image data to be eventually displayed by the liquid crystal projector 3 to the control means 22. Note that the image data may be data produced in the personal computer 2 or external data provided to the personal computer 2 (such as image data provided through the Internet, image data from an external image data output device (not shown) such as a VCR or a DVD player, and image data carried by electric waves received by a tuner (not shown) provided in the personal computer 2). The image data may be either still image data or moving image data.

The control means 22 serves as means for carrying out control operation related to processing to image data input through the image data input means 21 and includes a control unit and a control chip such as a CPU (Central Processing Unit), a north bridge, a south bridge, and a GPU (Graphics Processing Unit) (not shown).

The CPU is a control unit that carries out overall control in the control means 22.

The north bridge is a control chip connected to the CPU and connects an input/output element operating at high input/output speed such as a network interface and a GPU and a RAM (Random Access Memory) to the CPU.

The south bridge is a control chip connected to the CPU through the north bridge and connects peripheral elements such as a tuner, an HDD (Hard Disk Drive) and a USB controller 24 to the CPU through the north bridge.

The GPU is a control unit connected to the north bridge and carries out graphics processing to image data input to the control means 22. The GPU includes a high performance image processing IC recently developed specifically for use in a general personal computer and can provide a highly general-purpose program execution environment for executing an image processing program called shader.

As in the foregoing, while the specific configuration of the control means 22 including the control units and the control chips has been described, to facilitate the understanding of the invention and the embodiments, the control means 22 will hereinafter be described as functional blocks as shown in FIG. 1. Functionally speaking, the control means 22 includes shader request means 221 as the image processing program transmission request means and the shader executing means 222 as the image processing program executing means.

The shader request means 221 is functional means including a CPU and requests the liquid crystal projector 3 to transmit a shader as an image processing program through the USB controller 24 and the USB cable 4.

The shader is a program used for executing image data processing and stored in the liquid crystal projector 3 according to the embodiment as will be described. A plurality of kinds of such shaders are prepared according to the kinds of processing to be executed (#1 to #N in this embodiment), among which shaders used for processing for correcting characteristics of the liquid crystal projector 3 (such as VT correction, γ correction, and color unevenness correction) include characteristics correction data for such characteristics correction processing as parameters. In this example, the characteristics correction data is data specific to each individual liquid crystal projector 3, and when the data is included in a shader, characteristics correction processing suitable for the characteristics of the liquid crystal projector 3 can be carried out as will be described.

The shaders #1 to #N provided from the liquid crystal projector 3 in response to the transmission request from the shader request means 221 are stored in the shader storing means 23.

The shader executing means 222 is functional means including a GPU and executes the shaders #1 to #N stored in the shader storing means 23 to process image data input from the image data input means 21. As described above, some of the shaders include the characteristics correction data of the liquid crystal projector 3, and therefore the shader executing means 222 can execute such a shader to carry out the characteristics correction processing for the liquid crystal projector 3. Note that in addition to the shaders used for the characteristics correction processing for the liquid crystal projector 3, there are other kinds of shaders for carrying out for example picture quality improving processing to image data generally referred to as "color enhancement" and "image enhancement," and the shader executing means 222 can carry out these kinds of processing as well as the characteristics correction processing.

The shader storing means 23 is functional means including a VRAM (Video RAM) connected to the GPU in the control means 22 and stores the shaders #1 to #N provided from the liquid crystal projector 3 in response to a request from the shader request means 221 as described above. Note that the VRAM forming the shader storing means 23 is a memory that stores various kinds of data necessary for data processing in the GPU forming the shader executing means 222, and stores frame data to be displayed by the liquid crystal projector 3 as a frame buffer and data related to processing contents in the GPU in addition to the shaders #1 to #N.

The USB controller 24 is means for carrying out communication with the liquid crystal projector 3 through the USB cable 4. The USB controller 24 serves as the image data transmitting means according to the invention that transmits image data processed by the shader executing means 222 through the USB cable 4. The USB controller 24 also serves as shader receiving means for receiving a shader provided from the liquid crystal projector 3 in response to a request from the shader request means 221.

The liquid crystal projector 3 includes a USB controller 31 as communication means, control means 32, shader storing means 33 as image processing program storing means, a liquid crystal panel driver 34, a liquid crystal panel 35 as image display means, and a projection optical device 36.

The USB controller 31 is means used for communication with the personal computer 2 through the USB cable 4 and has the same structure as the USB controller 24 in the personal computer 2. The USB controller 31 serves as image data receiving means for receiving image data processed by the shader executing means 222 and transmitted through the USB cable 4 from the USB controller 24. The USB controller 31 serves as shader transmitting means (corresponding to the image processing program transmitting means according to the invention) that responds to a request from the shader request means 221 to transmit the shaders #1 to #N to the personal computer 2 through the USB cable 4.

The control means 32 serves as means for carrying out overall control in the liquid crystal projector 3.

The shader storing means 33 serves as means for storing the shaders #1 to #N transmitted to the personal computer 2 through the USB cable 4. In this example, the shaders #1 to #N are a program group used for executing almost all the necessary kinds of processing (such as characteristics correction processing for the liquid crystal projector 3 and picture quality improving processing) for displaying appropriate images at the liquid crystal projector 3 and stored in the shader storing means 33 in advance. As described above, the shaders #1 to #N are executed by the shader executing means 222, so that almost all the kinds of image data processing are carried out on the side of the personal computer 2, not on the side of the liquid crystal projector 3.

The liquid crystal panel driver 34 drives the liquid crystal panel 3 based on the image data processed by the shader executing means 222 received by the USB controller 31 and has the liquid crystal panel 35 display an image based on the image data. Three such liquid crystal panels 35 in total corresponding to RGB colors are provided though not shown in detail.

Images for these three colors RGB displayed by the three liquid crystal panels 35 are combined by a color composition optical device such as a cross dichroic prism in the projection optical device 36, magnified by a magnifying optical device such as a projection lens and projected on the screen 5.

Now, a method of setting up a shader in the image display system 1 having the above described structure will be described. The shader is set up before an image is displayed by the liquid crystal projector 3. For example, the shader may automatically be set up when the image display system 1 is activated or the moment setting of the image display system 1 is complete, or in response to the user operation.

Figure 2:
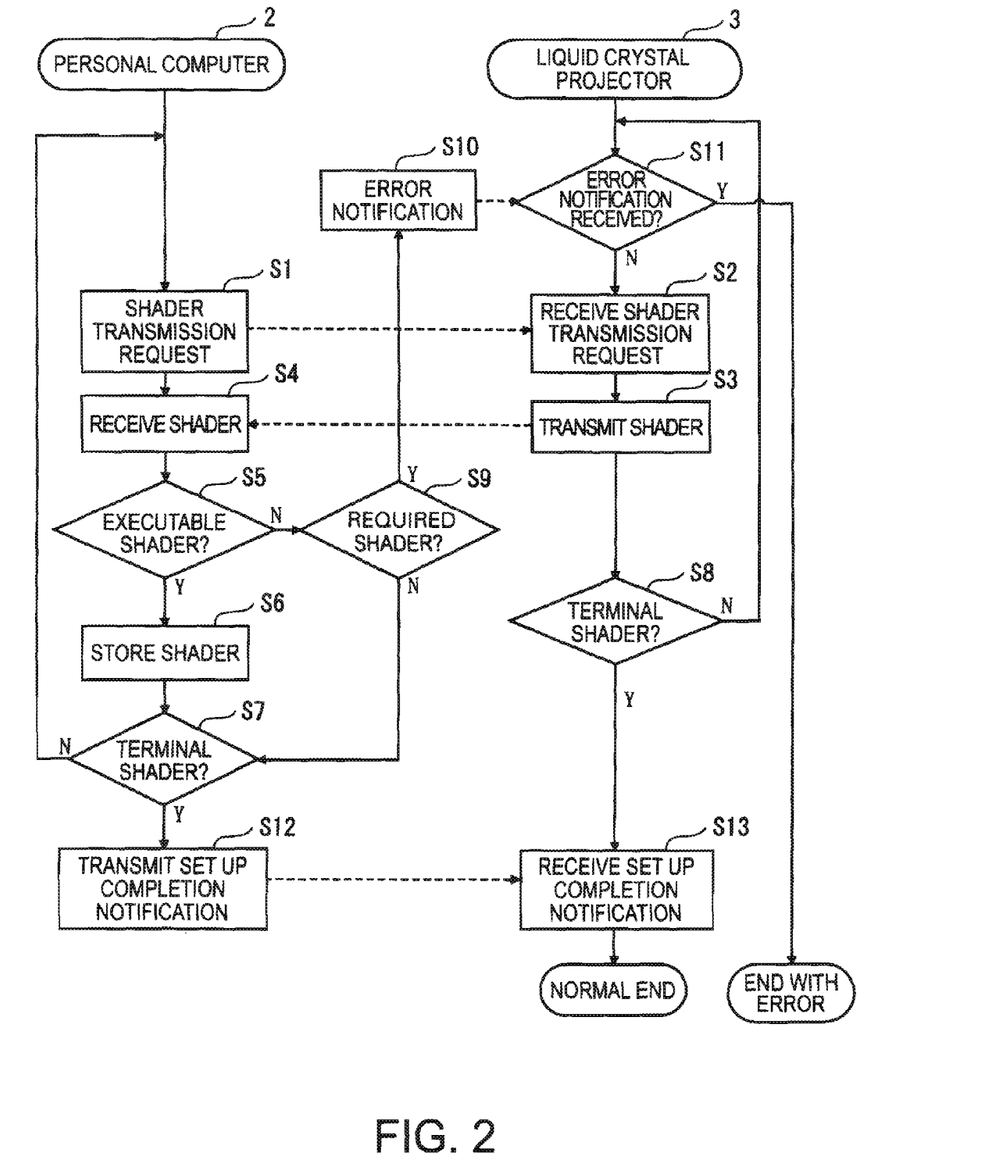
FIG. 2 is a flowchart for use in illustrating the flow of shader setup in the image display system according to the first embodiment.

FIG. 2 is a flowchart for use in illustrating the flow of how a shader is set up in the image display system 1.

In S1 (S for step) as an image processing program transmission request step, the shader request means 221 in the personal computer 2 requests the liquid crystal projector 3 to transmit a shader through the USB cable 4 using the USB controller 24.

In S2, the USB controller 31 in the liquid crystal projector 3 receives the shader transmission request in S1.

In S3 as an image processing program transmitting step, the control means 32 in the liquid crystal projector 3 reads out a shader among the plurality of shaders (#1 to #N) stored in the shader storing means 33 in response to the shader transmission request received in S2, and transmits the shader to the personal computer 2 through the USB cable 4 using the USB controller 31. Note that as will be described, S3 is repeatedly carried out until transmission of all the shaders #1 to #N stored in the shader storing means 33 is complete.

In S4 as an image processing program receiving step, the USB controller 24 in the personal computer 2 receives the shader transmitted in S3.

In S5, the control means 22 in the personal computer 2 determines whether the shader received in S4 is executable by the shader executing means 222. More specifically, the shader executing means 222 includes the GPU as described above and therefore the control means 22 refers to the processing capability of the GPU to determine whether the shader is executable. In this example, the shader is determined as not being executable if the processing amount necessary for executing the shader is beyond the processing capability of the GPU or if the shader includes data that cannot be processed by the GPU.

If it is determined in S5 that the shader is executable (Yes), the control means 22 stores the shader in the shader storing means 23 in S6.

Then in S7, the control means 22 determines whether the shader stored in S6 is a terminal shader. Here, the "terminal shader" refers to the shader transmitted last among the N shaders stored in the shader storing means 33 in the liquid crystal projector 3 in the repeatedly carried out step S3. Various approaches can be taken to determine whether the shader is a terminal shader. For example, the shader to be the terminal shader may be provided in advance with a flag indicating that the shader is the terminal shader, so that the control means 22 can readily determine the terminal shader based on the presence/absence of the flag. The shader storing means 33 in the liquid crystal projector 3 may store a shader that is not used to execute anything (empty shader) as the terminal shader, so that the control means 22 can readily determine the empty shader as the terminal shader.

Meanwhile, in the liquid crystal projector 3, it is determined in S8 similar to S7 in the personal computer 2 whether the shader transmitted by the control means 32 in S3 is a terminal shader. Note that the method of determining may be the same as that in S7.

If it is determined that the shader is not the terminal shader in S7 in the personal computer 2 and in S8 in the liquid crystal projector 3 (No), the process returns to S1, and the process from S1 to S6 is repeated until it is determined in S7 and S8 that the shader in question is the terminal shader (Yes).

During the repetition of S1 to S6 if it is determined in S5 that the shader is not executable (No), the control means 22 in the personal computer 2 determines in S9 whether the shader determined as not being executable is a required shader. Here, an arbitrary shader may be determined as a required shader while it is preferable that the required shader should be determined in view of image display by the liquid crystal projector 3. In this example, shaders used to carry out characteristics correction processing (such as VT correction and $\gamma$ correction) are often required for image display by the liquid crystal projector 3 and therefore preferably determined as required shaders. Shaders used to carry out picture quality improving processing (such as color enhancement and image enhancement) do not have to be determined as required shaders because the liquid crystal projector 3 can display images with the lower limit precision without carrying out the picture quality improving processing. Note that if each shader is provided in advance with a flag indicating whether the shader is required, the control means 22 can readily determine about the essentiality based on the flag.

If it is determined in S9 that the shader is not required (No), it is determined in S7 whether the shader is a terminal shader.

If it is determined in S9 that the shader is a required shader (Yes), the control means 22 transmits an error notification to the liquid crystal projector 3 through the USB controller 24 and the USB cable 4 in S10. The error notification notifies the liquid crystal projector 3 of that appropriate image display is impossible because the shader determined as not being executable (No) in S5 is a required shader for image display in the liquid crystal projector 3 (Yes in S9).

The error notification transmitted in the liquid crystal projector 3 in S10 is received by the USB controller 31. If the error notification is sensed by the control means 32 in S11 (Yes), the shader setup ends with error.

If the shader setup does not end with error and it is determined in S7 and S8 that the shader is a terminal shader (Yes), the control means 22 in the personal computer 2 transmits in S12 a shader setup completion notification to the liquid crystal projector 3 by the USB controller 24 through the USB cable 4.

In S13, the setup completion notification transmitted in S12 is received by the USB controller 31 in the liquid crystal projector 3. When the set up completion notification is sensed by the control means 32, the shader setup normally ends.

Figure 3:
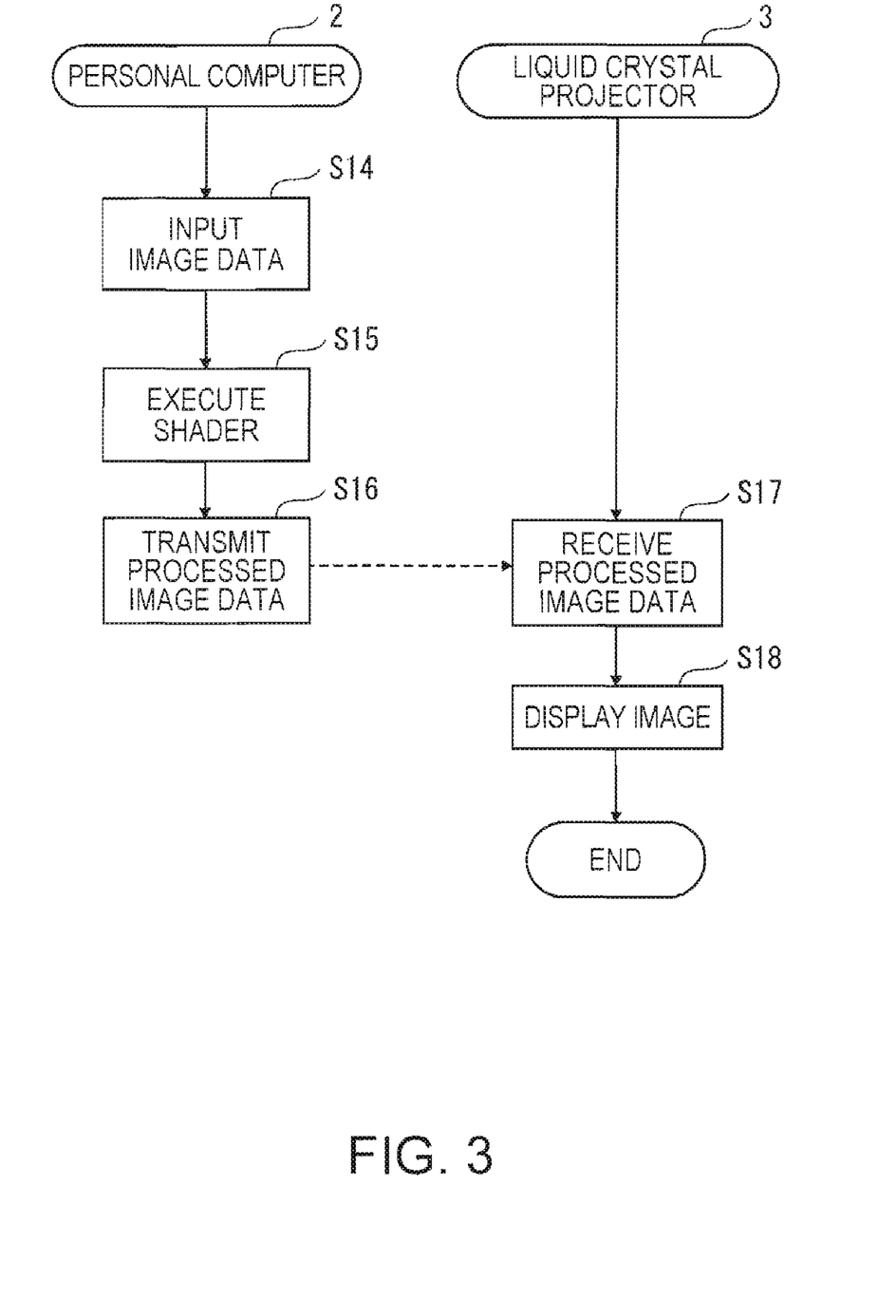
FIG. 3 is a flowchart for use in illustrating the flow of image display in the image display system according to the first embodiment.

Now, image display by the image display system 1 carried out based on the shader setup as described above will be described.

FIG. 3 is a flowchart showing the flow of image display in the image display system 1.

In S14, the image data input means 21 in the personal computer 2 inputs image data to the control means 22.

In S15 as an image processing program execution step, the shader executing means 222 in the control means 22 executes a shader stored in the shader storing means 23 and processes the image data input in S14.

In S16 as an image data transmitting step, the USB controller 24 transmits the image data processed in S15 to the liquid crystal projector 3 through the USB cable 4.

In S17 as an image data receiving step, the USB controller 31 in the liquid crystal projector 3 receives the image data transmitted in S16.

In S18 as an image display step, under the control of the control means 32, the liquid crystal panel driver 34 drives the liquid crystal panel 35 based on the image data received in S17 and has an image displayed based on the image data. The image displayed on the liquid crystal panel 35 is magnified and projected on the screen 5 by the projection optical device 36.

In the image display system 1 according to the embodiment described above, when the characteristics correction processing for the liquid crystal projector 3 is carried out by the personal computer 2, the personal computer 2 needs only prepare a general purpose environment for shader execution in the shader executing means 222 including the GPU, and a display device driver or the like corresponding to the kind of the liquid crystal projector 3 does not have to be installed in advance. Therefore, according to the embodiment, the personal computer 2 can readily carry out image data processing including characteristics correction processing for the liquid crystal projector 3 without having to carry out complicated operations.

Second Embodiment

Now, an image display system according a second embodiment of the invention will be described.

In the following, points in common with the first embodiment will not be described or will be touched on only briefly, and elements corresponding to those according to the first embodiment will be denoted by the same reference characters and will not be described or will be touched on only briefly.

Figure 4:
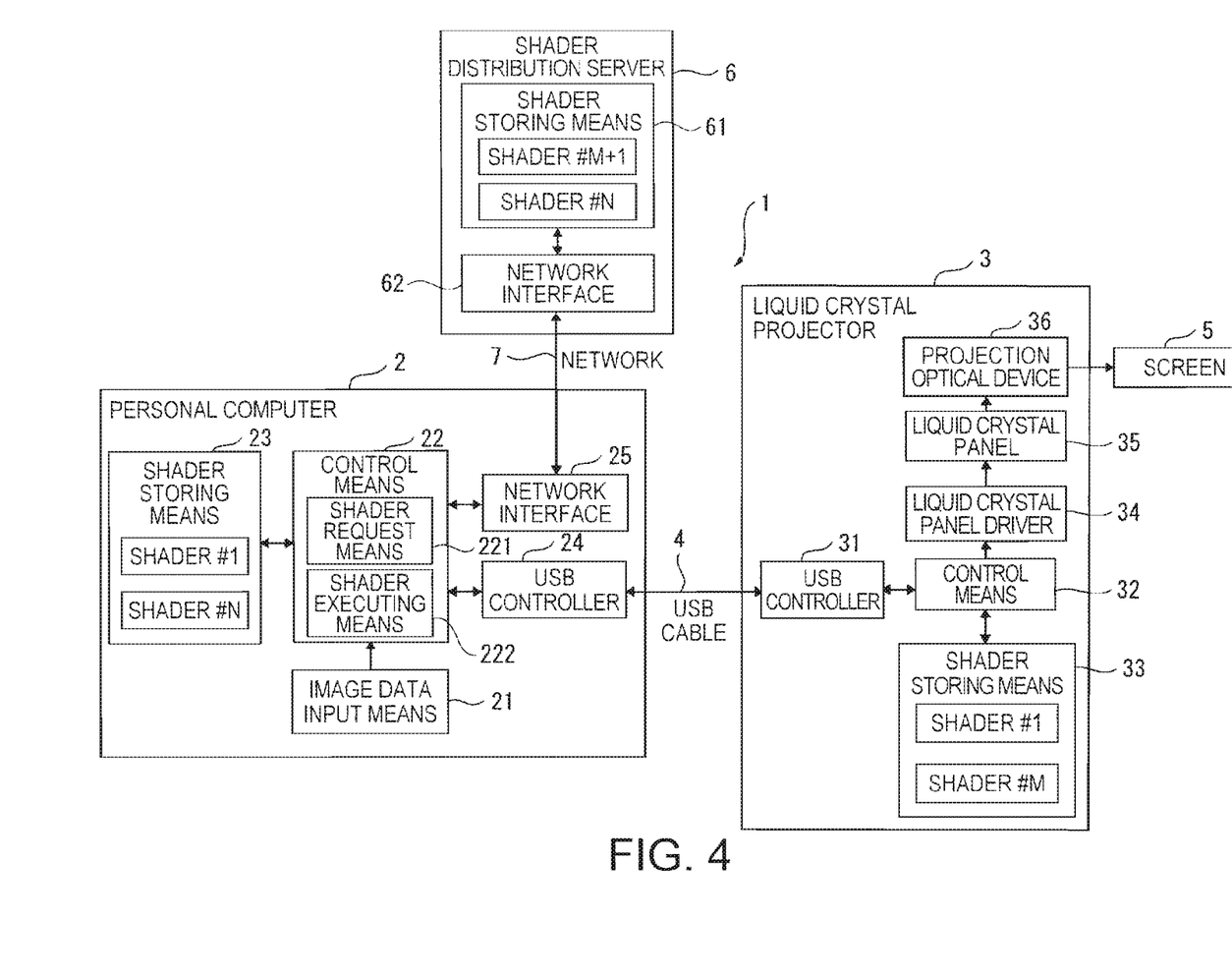
FIG. 4 is a functional block diagram of an image display system according to a second embodiment of the invention.

FIG. 4 is a functional block diagram of the image display system 1 according to the second embodiment of the invention.

The image display system 1 according to the second embodiment further includes a shader distribution server 6 as an image processing program distribution server connected to the personal computer 2 through a network 7 in addition to the configuration of the image display system 1 (FIG. 1) according to the first embodiment. Note that the personal computer 2 is provided with a network interface 25 to connect with the network 7.

The shader distribution server 6 includes shader storing means 61 as image processing program storing means and a network interface 62 as distribution request accepting means and image processing program distribution means.

The shader storing means 61 stores shaders to be transmitted to the personal computer 2 similarly to the shader storing means 33 in the liquid crystal projector 3.

As described above, according to the embodiment, the means for storing shaders are provided in the above locations, i.e., in the liquid crystal projector 3 and the shader distribution server 6, so that which means is used to store each shader can be selected.

In this way, all the shaders do not have to be stored in the liquid crystal projector 3, and therefore the stricture of the liquid crystal projector 3 can be simplified, so that the liquid crystal projector 3 can be compact and less expensive.

It is preferable that the shader storing means 33 in the liquid crystal projector 3 stores only shaders including data depending on the liquid crystal projector 3 (such as characteristics correction data used for characteristics correction processing for the liquid crystal projector 3), while the shader storing means 61 in the shader distribution server 6 stores only shaders including data not dependent on each liquid crystal projector 3 (such as shaders used to decode image data).

In this way, common shaders not dependent on each liquid crystal projector 3 can be stored together on a common environment in the form of the shader distribution server 6, which for example allows the shaders to be updated at a time, and improves the convenience in the operation. The liquid crystal projector 3 needs only store the shaders depending on itself, so that the structure of the liquid crystal projector 3 can be simplified.

In the image display system 1 according to the second embodiment having the above described stricture, shader setup is carried out as follows. The manner of setting up the shaders #1 to #M stored in the shader storing means 33 in the liquid crystal projector 3 is the same as that according to the first embodiment (FIG. 2) and therefore will not be described.

Upon identifying the liquid crystal projector 3 connected to the personal computer 2, the shader request means 221 carries out a distribution request for a shader for the liquid crystal projector 3 to the shader distribution server 6 through the network 7 by the network interface 25. In this example, the shader request means 221 serves as the image processing program distribution request means according to the invention.

Upon receiving the shader distribution request from the personal computer 2, the network interface 62 in the shader distribution server 6 reads out the shaders #M+1 to #N stored in the shader storing means 61 and distributes them to the personal computer 2 through the network 7. The shaders #M+1 to #N thus distributed are stored in the shader storing means 23 in the personal computer 2 similarly to the first embodiment, and the shader setup is complete.

Note that the flow of image display based on the set up shader is the same as that according to the first embodiment (FIG. 3) and therefore will not be described.

Third Embodiment

Now, an image display system according to a third embodiment of the invention will be described.

Note that points in common with the image display systems according to the first and second embodiments will not be described or will be touched on only briefly, and elements corresponding to those according to the first and second embodiments are denoted by the same reference characters and will not be described or will be touched on only briefly.

Figure 5:
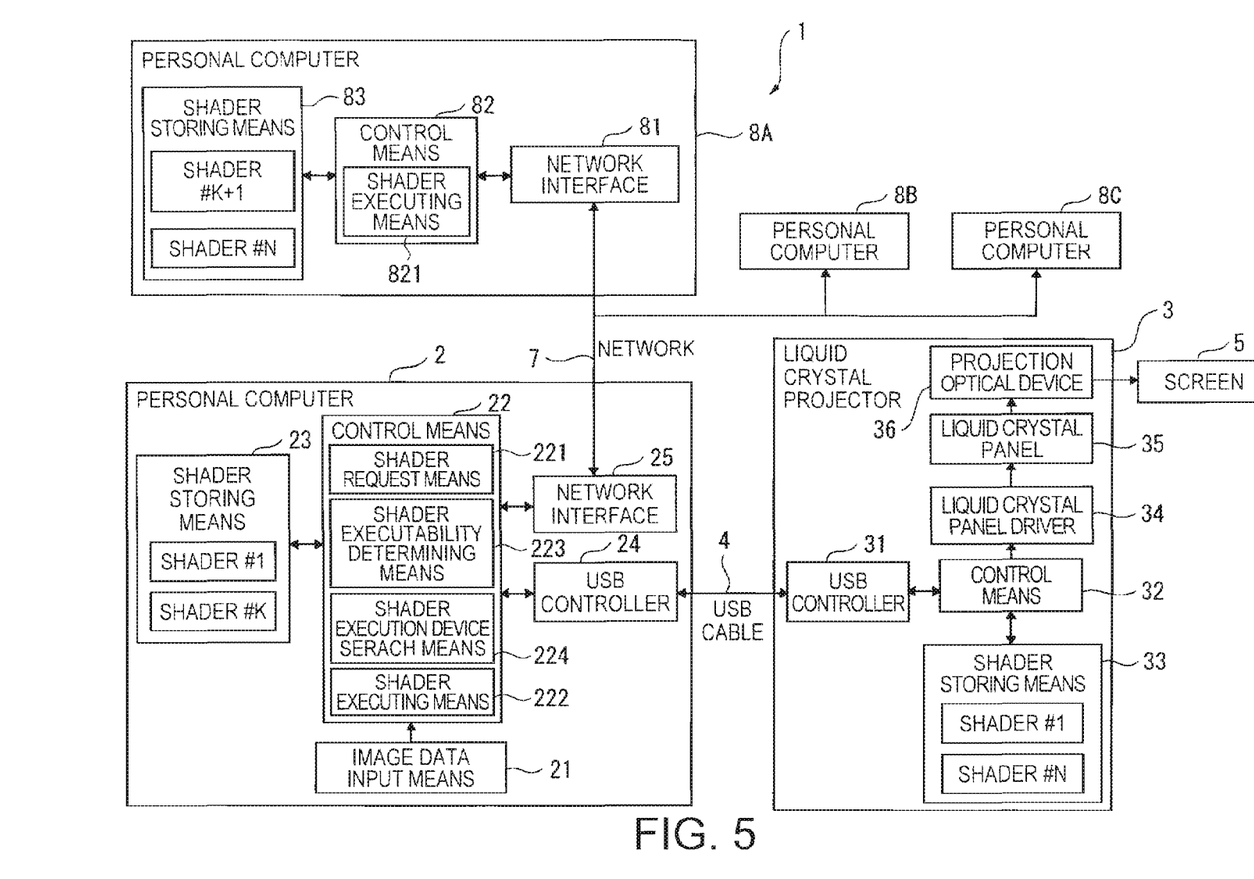
FIG. 5 is a functional block diagram of an image display system according to a third embodiment of the invention.

FIG. 5 is a functional block diagram of the image display system 1 according to the third embodiment of the invention.

The image display system 1 according to the third embodiment includes a plurality of personal computers 8A, 8B, and 8C as image processing program execution devices connected to a personal computer 2 as the image data processor according to the invention through a network 7 that allows bi-directional communication.

The personal computer 8A includes a network interface 81, control means 82, and shader storing means 83.

The network interface 81 is an interface used to connect the personal computer 8A to the network 7. The personal computer 8A can exchange various kinds of data (such as image data and shaders) with the network 7 through the network interface 81.

The control means 82 carries out control operation related to processing of data input through the network interface 81 and functionally includes the shader executing means 821. Here, the shader executing means 821 is functional means including a GPU similarly to the shader executing means 222 in the personal computer 2 and carries out the shaders #K+1 to #N (that will be described) stored in the shader storing means 83 to carry out processing of image data input through the network interface 81.

The shader storing means 83 is functional means including a VRAM connected to the GPU in the control means 82 similarly to the shader storing means 23 in the personal computer 2 and stores the shaders #K+1 to #N (that will be described) provided through the network interface 81.

The configuration of the personal computers 8B and 8C is basically the same as that of the personal computer 8A though it is neither described nor shown.

According to the embodiment, the control means 22 in the personal computer 2 further includes shader executability determining means 223 as image processing program executability determining means and shader execution device search means 224 as image processing program execution device search means in addition to the shader request means 221 and the shader executing means 222 according to the first and second embodiments.

The shader executability determining means 223 is functional means including a CPU and determines whether a shader transmitted from the liquid crystal projector 3 and received by the USB controller 24 can be executed by the shader executing means 222. More specifically, the shader executability determining means 223 refers to the processing capability of the GPU of the shader executing means 222 and determines whether the shader is executable. Here, the shader is determined as not being executable if for example a processing amount necessary for executing the shader in question is beyond the processing capability of the GPU or the shader includes data that cannot be processed by the GPU.

The shader execution device search means 224 is functional means including a CPU and searches for an external shader execution device that can execute the shader determined as not being executable by the shader executability determining means 223. According to the embodiment, there are the three personal computers 8A, 8B and 8C as external shader execution devices, and the shader execution device search means 224 searches among these personal computers.

Once a shader execution device (the personal computer 8A, 8B, or 8C) to execute the shader is found by searching by the shader execution device search means 224, the network interface 25 transmits the shader to the found shader execution device through the network 7 under the control of the control means 22. In this way, the network interface 25 serves as the image processing program transmitting means according to the invention.

Now, shader setup in the image display system 1 according to the third embodiment having the above-described structure will be described.

Figure 6:
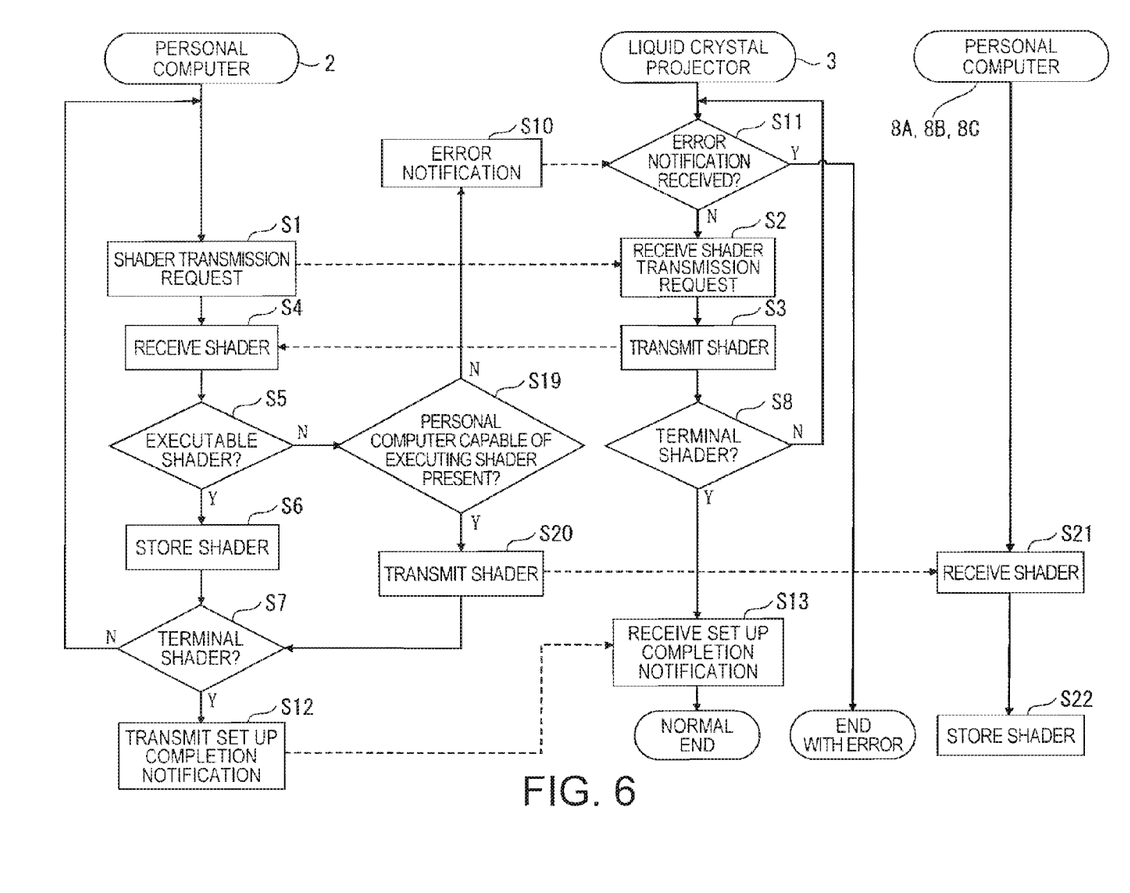
FIG. 6 is a flowchart for use in illustrating the flow of shader setup in the image display system according to the third embodiment.

FIG. 6 is a flowchart illustrating the flow of shader setup in the image display system 1 according to the third embodiment. In the following, the difference from the flowchart according to the first embodiment (FIG. 2) will mainly be described.

After S1 to S4, the shader executability determining means 223 determines in S5 whether the shader received in S4 can be executed by the shader executing means 222.

If the shader is determined in S5 as not being executable (No), the shader execution device search means 224 searches for a shader execution device that can execute the shader determined as not being executable in S19. According to the embodiment, the shader execution device search means 224 searches for a personal computer that can execute the shader in question among the three personal computers 8A, 8B, and 8C.

If a personal computer that can execute the shader is found in S19 (Yes), the network interface 25 transmits the shader to the personal computer (8A, 8B, or 8C) under the control of the control means 22 in S20.

Hereinafter, for ease of description, the case in which the personal computer 8A is found in S19 as the personal computer that can execute the shader will be described by way of illustration. More specifically, assume that the shader is transmitted to the personal computer 8A in S20.

In S21, the network interface 81 in the personal computer 8A receives the shader transmitted in S20.

S22, the shader storing means 83 stores the shader received in S21 under the control of the control means 82.

Meanwhile, in the personal computer 2, S7 is carried out after S20, and the control means 22 determines whether the shader transmitted in S20 is a terminal shader. If the result of determination in S7 is No, the process returns to S1, and if the result is Yes, the process proceeds to S12.

Note that if no personal computer that can execute the shader is found in S19 (No), the shader setup ends with error after S10 and S11 (Yes).

In this example, for a shader determined as not being executable (No) by any of the personal computers 8A, 8B, and 8C in S19, the step of determining whether the shader in question is a required shader may be provided similarly to S9 according to the first embodiment (FIG. 2). In this case, as with the first embodiment, if the shader is a required shader (Yes), the process may proceed to S10 so that an error notification is transmitted, while if the shader is not a required shader (No), the process may proceed to S7 and continue.

In the following, image display in the image display system 1 will be described assuming that as a result of the shader setup as described above, K shaders #1 to #K among the N shaders #1 to #N stored in the shader storing means 33 in the liquid crystal projector 3 are set up (stored) in the shader storing means 23 in the personal computer 2 as shown in FIG. 5, and the remaining N-K shaders #K+1 to #N are set up (stored) in the shader storing means 83 in the personal computer 8A.

Figure 7:
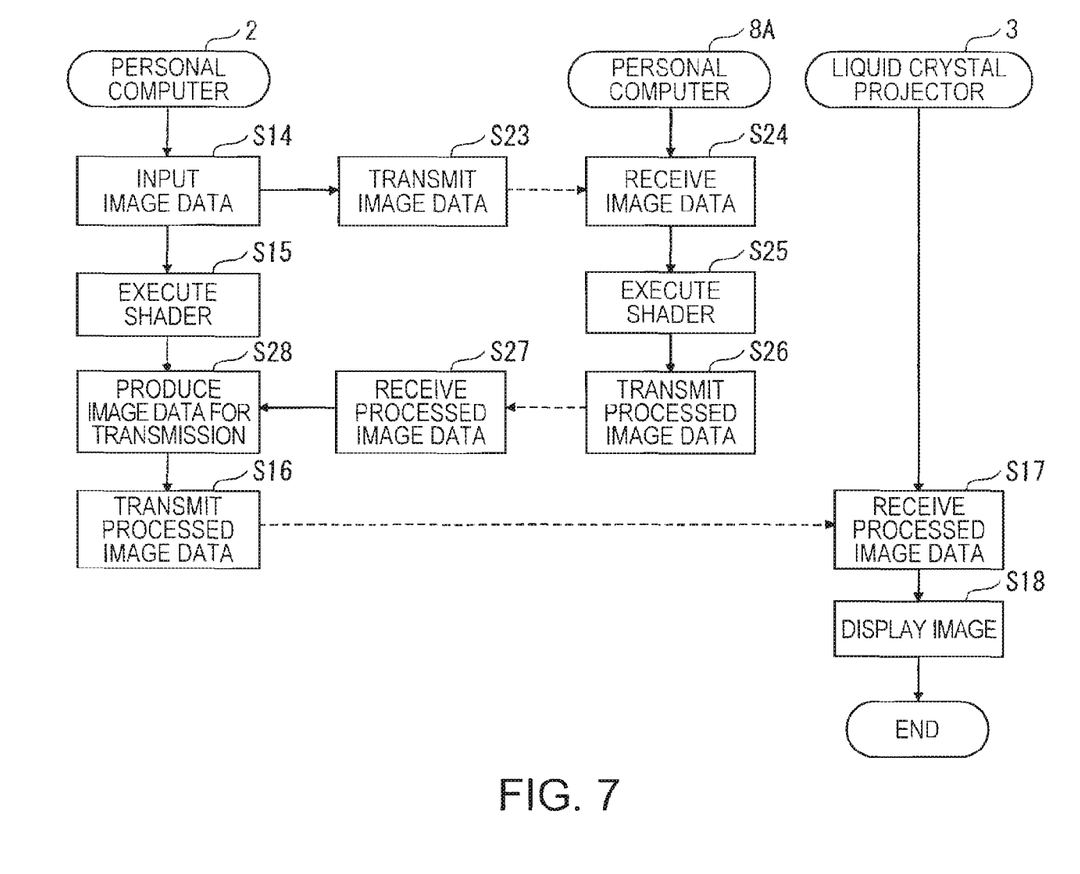
FIG. 7 is a flowchart for use in illustrating the flow of image display in the image display system according to the third embodiment.

FIG. 7 is a flowchart showing the flow of image display in the image display system 1.

In S14, the image data input means 21 in the personal computer 2 inputs image data to the control means 22.

In S15, the shader executing means 222 in the control means 22 executes the shaders #1 to #K stored in the shader storing means 23 and processes the image data input in S14.

In the personal computer 2, S23 is carried out in parallel with S15 after S14, and the network interface 25 transmits the image data input in S14 to the personal computer 8A through the network 7 under the control of the control means 22.

In S24, the network interface 81 in the personal computer 8A receives the image data transmitted in S23.

In S25, the shader executing means 821 in the control means 82 executes the shaders #K+1 and #N stored in the shader storing means 83 and processes the image data received in S24.

In S26, the network interface 81 transmits the image data processed in S25 to the personal computer 2 through the network 7 under the control of the control means 82.

In S27, the network interface 25 in the personal computer 2 receives the image data transmitted in S26.

In S28, the control means 22 in the personal computer 2 produces image data to be eventually displayed by the liquid crystal projector 3 based on the image data processed by the shader executing means 222 in S15 and the image data processed by the shader executing means 821 in S25 and received by the network interface 25 in S27. Here, the processing based on K shaders #1 to #K is carried out in S15, while the processing is carried out based on N-K shaders #K+1 to #N in S25, so that the image data produced in S28 is image data processed based on all the (N) shaders #1 to #N stored in the shader storing means 33 in the liquid crystal projector 3 (corresponding to the image data produced in S15 according to the first embodiment in FIG. 3).

In the following S16 to S18, as with the first embodiment, image display based on the image data produced in S28 is carried out.

Note that in the foregoing, the shader numbers #1 to #N are given for ease of description and are totally irrelevant to the order of processing the shaders. In the above described example, the personal computers 8B and 8C do not store a shader but this is also for ease of description, and it goes without saying that shaders can be stored in these personal computers. In short, by the shader setup as shown in FIG. 6, the N shaders stored in the liquid crystal projector 3 are set up (stored) separately among the four personal computers 2, 8A, 8B, and 8C.

With the image display system 1 as described above, a shader that cannot be executed by the personal computer 2 can be executed by the external personal computer 8A, 8B, or 8C instead. Therefore, shader execution processing can be carried out among the plurality of devices (the personal computers 2, 8A, 8B, and 8C), which reduces the processing load of each device and enables efficient processing suitable for the characteristics of each device to be carried out.

Modifications

The present invention is not limited by the above-described embodiments, these embodiments may be modified as long as the object of the invention can be achieved and the modifications are still within the technological scope of the invention.

For example, in the above-described embodiments, the liquid crystal projector 3 is provided with the shader storing means 33 as image processing program providing means and at least one shader as an image processing program is stored in the storing means, while the liquid crystal projector 3 does not have to store a shader. In this case, shaders may be stored in the shader distribution server 6 (see FIG. 4) connected with the personal computer 2 as the image data processor through the network 7 (see FIG. 4). Here, the shaders stored in the shader distribution server 6 include shaders depending on each individual image display device (such as the liquid crystal projector 3) (shaders used for characteristics correction processing for the image display device).

In the image display system 1 as described above, shader setup is carried out as follows.

A kind/solid data request means (not shown) including a CPU in the personal computer 2 requests the liquid crystal projector 3 to transmit the kind data and solid data (such as the serial number) of the liquid crystal projector 3. Kind/solid data providing means (not shown) in the liquid crystal projector 3 transmits its kind/solid data stored in the liquid crystal projector 3 through the USB cable 4 as a transmission path in response to the request. Then, the shader request means 221 in the personal computer 2 requests the shader distribution server 6 to distribute shaders corresponding to the received kind/solid data. In response to the request, the shader distribution server 6 distributes the shaders corresponding to the kind/solid data of the liquid crystal projector 3 to the personal computer 2. The distributed shaders are set up (stored) in the shader storing means 23 in the personal computer 2. As described above, the shaders corresponding to the kind/solid data of the liquid crystal projector 3 are set up in the shader storing means 23, so that image data suitable for the liquid crystal projector 3 can appropriately be processed based on the shaders.

With the image display system 1 as described above, shaders do not have to be stored in the liquid crystal projector 3 and only its kind/solid data is stored therein, which can simplify the structure of the liquid crystal projector 3 and reduce the size and price of the liquid crystal projector 3.

Meanwhile, shaders are provided by the server at a time, the use state of the image display devices (such as the liquid crystal projector 3) can readily be available to the server operating side through the shader distribution information, and therefore for example efficient copyright management of images to be displayed by the display devices can be exercised.

In addition, in the second embodiment in which the shader storing means 33 is provided in the liquid crystal projector 3 and shader storing means 61 is provided in the shader distribution server 6 (see FIG. 4), the shader storing means 33 in the liquid crystal projector 3 and the shader storing means 61 in the shader distribution server 6 may store the same kinds of shaders. In this case, the shader request means 221 in the personal computer 2 may selectively request a better one (such as a new version shader) among the same kinds of shaders stored in both storing means, so that image data can be processed more appropriately.

Furthermore, in the above-described embodiments, the liquid crystal projector 3 is provided as the image display device, while various other kinds of image display devices (such as a liquid crystal display, a plasma display, a CRT display, and an organic EL display) may be provided as the image display device.

According to the above-described embodiments, the personal computer 2 as the image data processor and the liquid crystal projector 3 as the image display device are connected through the USB cable 4 as a transmission path, but the transmission path is not limited to the USB cable but any of various kinds of transmission cables other than the USB cable or a network may be employed as the transmission path.

The present invention is applicable to an image display system.

What is claimed is:

1. An image display system, comprising:
   an image data processor that processes image data;
   an image display device that displays an image based on the image data processed by the image data processor; and
   a transmission path that enables bi-directional data communication between the image data processor and the image display device,
   the image display device including:
      an image processing program storing unit that stores an image processing program including characteristics correction data corresponding to the image display device;
      an image processing program transmitting unit, responsive to a transmission request for an image processing program received from the image data processor, through the transmission path, to transmit the image processing program stored in the image processing program storing unit through the transmission path; and
      an image display unit that displays an image based on the processed image data received from the image data processor through the transmission path;
   the image data processor including:
      an image processing program transmission request unit that requests the image display device to transmit an image processing program;
      an image processing program executing unit that executes the image processing program, transmitted from the image display device in response to the request by the image processing program transmission request unit, thereby executing image data processing including characteristics correction processing for the image display device based on the characteristics correction data; and
      an image data transmitting unit that transmits the image data processed by the image processing program executing unit to the image display device through the transmission path, wherein an error notification unit that 1) returns an error when a) the image processing program is present, b) the image processing program cannot be executed by the image processing program executing unit and c) the image data processor determines that the image processing program is required by the image processing program executing unit to process the image data, and 2) does not return an error when a) the image processing program cannot be executed by the image processing program executing unit after being attempted to be executed and b) the image data processor determines that the image processing program is not required by the image processing program executing unit to process the image data.

2. The image display system according to claim 1, further including at least one image processing program execution device, the image data processor being connected with the at least one image processing program execution device that is capable of executing an image processing program through the transmission path, and
   the image data processor including:
      an image processing program executability determining unit that determines whether the image processing program executing unit can execute the image processing program transmitted from the image display device;
      an image processing program execution device search unit, responsive to a determination by the image processing program executability determining unit that the image processing program is not executable, to search for one of the at least one image processing program execution device that can execute the image processing program; and
      an image processing program transmitting unit that transmits the image processing program to the one image processing program execution device found by the image processing program execution device search unit as being able to execute the image processing program.

3. The image display system according to claim 1, further including an image processing program distribution server, the image data processor being connected with the image processing program distribution server that distributes an image processing program for the image display device through a network that enables bi-directional communication,
   the image data processor including an image processing program distribution request unit that requests the image processing program distribution server to distribute the image processing program for the image display device upon identifying the image display device connected to the image data processor, and
   the image processing program distribution server including:
      an image processing program storing unit that stores an image processing program corresponding to the image display device;
      a distribution request accepting unit that accepts the distribution request from the image data processor; and
      an image processing program distribution unit, responsive to the distribution request accepted by the distribution request accepting unit, to distribute the image processing program stored in the image processing program storing unit.

4. The image display system according to claim 1, the image processing program being a shader.

5. An image display method using an image display system that includes an image data processor that processes image data, an image display device that displays an image based on the image data processed by the image data processor, and a transmission path that enables bi-directional data communication between the image data processor and the image display device, the image display method comprising:

storing an image processing program including characteristics correction data corresponding to the image display device;

transmitting the stored image processing program through the transmission path, in response to a transmission request for the image processing program received from the image data processor through the transmission path;

displaying an image based on the processed image data received from the image data processor through the transmission path;

requesting, with the image data processor, that the image display device transmit an image processing program;

determining whether the image processing program transmitted from the image display device can be executed by the image data processor;

executing, with the image data processor, the image processing program transmitted from the image display device in response to the image processing program transmission request, thereby executing image data processing including characteristics correction processing for the image display device based on the characteristics correction data; and transmitting, with the image data processor, the image data processed by the image processing program execution to the image display device through the transmission path, wherein an error notification unit that 1) returns an error when a) the image processing program is present, b) the image processing program cannot be executed by an image processing program executing unit and c) the image data processor determines that the image processing program is required by the image processing program executing unit to process the image data, and 2) does not return an error when a) the image processing program cannot be executed by the image processing program executing unit after being attempted to be executed and b) the image data processor determines that the image processing program is not required by the image processing program executing unit to process the image data.

6. The image display method according to claim 5, the image processing program being a shader.

7. An image display device for use with an image data processor that processes image data through a transmission path that enables bi-directional data communication and displaying an image based on the image data processed by the image data processor, the image display device comprising:

an image processing program storing unit that stores an image processing program including characteristics correction data corresponding to the image display device;

an image processing program transmitting unit, responsive to an image processing program transmission request received from the image data processor, through the transmission path, to transmit the image processing program stored in the image processing program storing unit through the transmission path; and an image display unit that displays an image based on the processed image data received from the image data processor through the transmission path, wherein an error notification unit that 1) returns an error when a) the image processing program is present, b) the image processing program cannot be executed by an image processing program executing unit and c) the image data processor determines that the image processing program is required by the image processing program executing unit to process the image data, and 2) does not return an error when a) the image processing program cannot be executed by the image processing program executing unit after being attempted to be executed and b) the image data processor determines that the image processing program is not required by the image processing program executing unit to process the image data.

8. The image display device according to claim 7, the image processing program being a shader.

9. An image data processor for use with an image display device and a transmission path that enables bi-directional communication, processing image data and transmitting the image data to the image display device through the transmission path, the image data processor comprising:

an image processing program transmission request unit that requests the image display device to transmit an image processing program including characteristics correction data corresponding to the image display device;

an image processing program executing unit that executes the image processing program, transmitted from the image display device in response to the request by the image processing program transmission request unit, thereby executing image data processing including characteristics correction processing for the image display device based on the characteristics correction data; and an image data transmitting unit that transmits the image data processed by the image processing program executing unit to the image display device through the transmission path, wherein an error notification unit that 1) returns an error when a) the image processing program is present, b) the image processing program cannot be executed by the image processing program executing unit and c) the image data processor determines that the image processing program is required by the image processing program executing unit to process the image data, and 2) does not return an error when a) the image processing program cannot be executed by the image processing program executing unit after being attempted to be executed and b) the image data processor determines that the image processing program is not required by the image processing program executing unit to process the image data.

10. The image data processor according to claim 9, the image processing program being a shader.

11. A non-transitory computer-readable storage medium having a computer-executable program embedded thereon that is executed in an image data processor, connected with an image display device through a transmission path that enables bi-directional communication, processing image data, and transmitting the processed data to the image display device through the transmission path, the program comprising:

instructions for requesting the image display device to transmit an image processing program including characteristics correction data corresponding to the image display device;

instructions for executing the image processing program transmitted from the image display device in response to the request thereby executing image data processing including characteristics correction processing for the image display device based on the characteristics correction data; and instructions for transmitting the processed image data to the image display device through the transmission path, wherein an error notification unit that 1) returns an error when a) the image processing program is present, b) the image processing program cannot be executed by an image processing program executing unit and c) the image data processor determines that the image processing program is required by the image processing program executing unit to process the image data, and 2)

does not return an error when a) the image processing program cannot be executed by the image processing program executing unit after being attempted to be executed and b) the image data processor determines that the image processing program is not required by the image processing program executing unit to process the image data.

12. The computer-executable program according to claim 11, the image processing program being a shader.

13. An image display system, comprising:
an image data processor that processes image data; and
an image display device, connectable to the image data processor to enable bi-directional data communication, that displays an image based on the image data processed by the image data processor, the image display device storing an image processing program that includes characteristics correction data corresponding to the image display device, the image display device being able to transmit the image processing program to the image data processor to enable the image data processor to execute the image processing program and to transmit the processed image data to the image display device, wherein an error notification unit that 1) returns an error when a) the image processing program is present, b) the image processing program cannot be executed by an image processing program executing unit and c) the image data processor determines that the image processing program is required by the image processing program executing unit to process the image data, and 2) does not return an error when a) the image processing program cannot be executed by the image processing program executing unit after being attempted to be executed and b) the image data processor determines that the image processing program is not required by the image processing program executing unit to process the image data.

14. The image display system according to claim 13, the image data processor including a general-purpose execution environment that allows the image processing program to be executed and can execute processing corresponding to the image display device type based on the data included in the image processing program.

15. The image display system according to claim 13, the image processing program being a shader.

* * * * *